(12) United States Patent
Yu (10) Patent No.: US 10,384,287 B2
(45) Date of Patent: Aug. 20, 2019

(54) REPAIR PIN-STUD FOR REPAIRING HONEYCOMB PEARLS

(71) Applicant: The Boeing Company, Chicago, IL (US)

(72) Inventor: Howe Hao Yu, Renton, WA (US)

(73) Assignee: The Boeing Company, Chicgo, IL (US)

(*) Notice: Subject to any disclaimer, the term of this patent is extended or adjusted under 35 U.S.C. 154(b) by 123 days.

(21) Appl. No.: 15/428,116

(22) Filed: Feb. 8, 2017

(65) Prior Publication Data

US 2017/0144259 A1 May 25, 2017

Related U.S. Application Data

(62) Division of application No. 13/794,333, filed on Mar. 11, 2013.

(51) Int. Cl.
| | |
|---|---|
| *B23P 6/04* | (2006.01) |
| *B23K 31/02* | (2006.01) |
| *B23K 11/34* | (2006.01) |
| *B23K 11/26* | (2006.01) |
| *B23K 11/00* | (2006.01) |
| *B23K 9/00* | (2006.01) |
| *B23K 9/20* | (2006.01) |
| *B23P 6/00* | (2006.01) |
| *B23K 101/02* | (2006.01) |

(52) U.S. Cl.
CPC ............. *B23K 9/0026* (2013.01); *B23K 9/20* (2013.01); *B23P 6/00* (2013.01); *B23K 2101/02* (2018.08); *B23P 2700/01* (2013.01)

(58) Field of Classification Search
CPC .... B23K 9/0026; B23K 9/20; B23K 2101/02; B23K 35/0288; B23K 9/208; B23K 11/0053; B23K 9/22; B23K 9/201; B23P 6/00; B23P 2700/01; B21D 47/00
USPC ................ 219/78.15, 78.11, 99, 98, 96, 95; 228/181; 29/524.1, 525.06, 526.4, 28, 29/34 B, 243.53
See application file for complete search history.

(56) References Cited

U.S. PATENT DOCUMENTS

| | | | | |
|---|---|---|---|---|
| 3,263,130 | A * | 7/1966 | Duvall | G01R 11/04 361/662 |
| 3,801,772 | A * | 4/1974 | Curcio | B21D 1/06 219/98 |
| 4,509,243 | A * | 4/1985 | Schneider | F16B 19/1054 138/98 |
| 7,954,517 | B1 * | 6/2011 | Marinelli | F16L 55/168 138/97 |

* cited by examiner

*Primary Examiner* — Tu B Hoang
*Assistant Examiner* — Diallo I Duniver
(74) *Attorney, Agent, or Firm* — Duft & Bornsen, PC (57) ABSTRACT

A repair pin-stud used in processes for repairing panels, such as honeycomb panels. The repair pin-stud includes a cylindrical stud member, a tip on a first end of the cylindrical stud member, and an elongated installation member connected to a second end of the cylindrical stud member. The repair pin-stud further includes a tubular pin concentric with the cylindrical stud member. A first end of the tubular pin is connected to the cylindrical stud member, and a second end of the tubular pin is open and the elongated installation member extends outwardly from the second end of the tubular pin.

19 Claims, 11 Drawing Sheets

FIG. 20

REPAIR PIN-STUD FOR REPAIRING HONEYCOMB PEARLS

RELATED APPLICATIONS

This patent application is a divisional of co-pending United States non-provisional patent application Ser. No. 13/794,333, filed on Mar. 11, 2013, which is hereby incorporated by reference.

FIELD

This disclosure relates to the field of repairing honeycomb panels.

BACKGROUND

A honeycomb panel (also referred to as a honeycomb sandwich panel) is a composite structure having a honeycomb core sandwiched between two sheets of material. Honeycomb panels have a high strength-to-weight ratio, which makes them useful in a variety of applications, such as aerospace. One particular application of honeycomb panels is in an exhaust nozzle of a jet engine.

When honeycomb panels are damaged, it may be desirable to repair the damaged section instead of replacing the entire panel. Therefore, a variety of processes are used to repair damaged sections of honeycomb panels.

SUMMARY

Embodiments described herein include a repair pin-stud for repairing a damaged section of a honeycomb panel or other types of panels. The repair pin-stud includes a cylindrical stud member, a tip on a first end of the cylindrical stud member, and an elongated installation member connected to a second end of the cylindrical stud member. The tubular pin is concentric with the cylindrical stud member. A first end of the tubular pin is connected to the cylindrical stud member, and a second end of the tubular pin is open and the elongated installation member extends outwardly from the second end of the tubular pin.

Another embodiment includes a method of repairing damage in a panel having a core sandwiched between an inner face sheet and an outer face sheet. The method includes drilling a hole through the inner face sheet of the panel, and inserting an insulating sleeve into the hole. The method further includes inserting a repair pin-stud into the hole, percussion welding (also referred to as capacitor discharge stud welding) the repair pin-stud to an inner surface of the outer face sheet with a stud welder, and twisting off the installation member of the repair pin-stud. The method further includes fusion welding the repair pin-stud to the inner face sheet, and welding an open end of the repair pin-stud closed using a weld filler wire.

In another embodiment, the method further includes retaining the repair pin-stud in the inner face sheet by expanding the open end of the repair pin-stud before fusion welding the repair pin-stud to the inner face sheet.

In another embodiment, the method further includes grinding the welds on the inner face sheet to be flush with the inner face sheet.

In another embodiment, if the damage on the panel comprises a dent in the outer face sheet, then the method further includes straightening the dent in the outer face sheet before inserting the repair pin-stud into the hole. The dent may be straightened by inserting a solid rod into the hole, and pressing the solid rod against the dent to return a contour of the outer face sheet to a blueprint contour. A phenolic block may be placed on an outer surface of the outer face sheet when pressing the solid rod against the dent.

In another embodiment, the method further includes cutting a damaged section from the inner face sheet, preparing a patch for the inner face sheet, and welding the patch to the inner face sheet.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
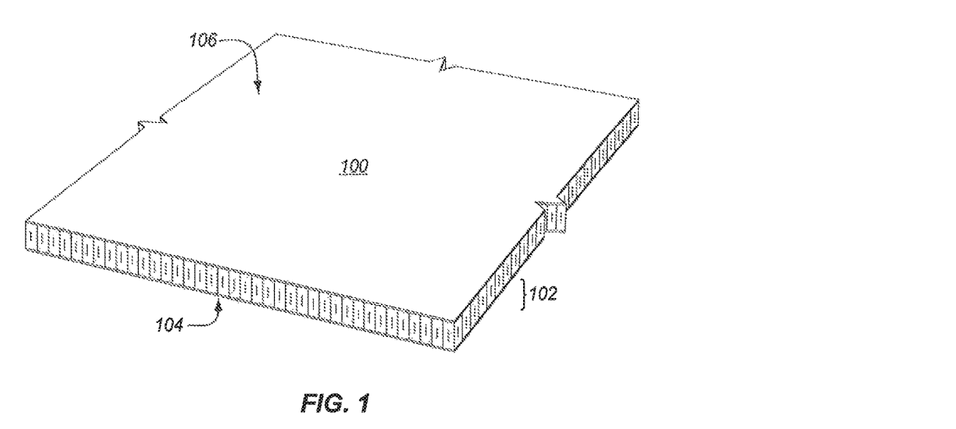
FIG. 1 is an isometric view of a honeycomb panel assembly in an exemplary embodiment.

FIG. 1 is an isometric view of a honeycomb panel assembly 100 in an exemplary embodiment. Honeycomb panel assembly 100 is comprised of a honeycomb core 102 sandwiched between an inner face sheet 104 and an outer face sheet 106. Inner face sheet 104 and outer face sheet 106 may be solid sheets of material, or may be perforated. Honeycomb panel assembly 100 has a variety of applications, such as in an exhaust nozzle of a jet engine. Although a honeycomb panel is described in the following embodiment, the concepts described herein apply to other types of panels having a core sandwiched between two face sheets.

Figure 2:
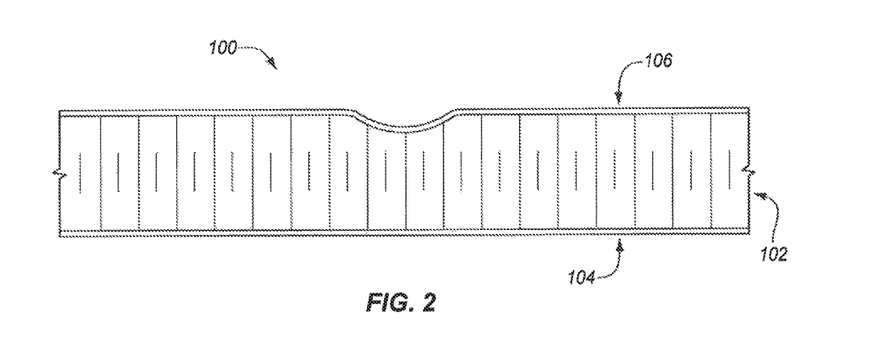
FIG. 2 is a side view of a honeycomb panel assembly with a damaged section in an exemplary embodiment.

When honeycomb panel assembly 100 is used as a structural member in a product, it may become damaged over time. For example, honeycomb panel assembly 100 may be dented or punctured by impact from a foreign object. In another example, inner face sheet 104 and outer face sheet 106 may crack or may become disbonded from honeycomb core 102 due to high temperatures, high pressures, etc. FIG. 2 is a side view of honeycomb panel assembly 100 with a damaged section in an exemplary embodiment. The view in FIG. 2 illustrates a small dent in the outer face sheet 106 of honeycomb panel assembly 100. A dent is just one example of damage to honeycomb panel assembly 100.

Instead of replacing the entire honeycomb panel assembly 100 that is damaged, it may be desirable to repair the damaged section. The following embodiments describe a repair pin-stud and a process for repairing damage to honeycomb panel assembly 100.

Figure 3:
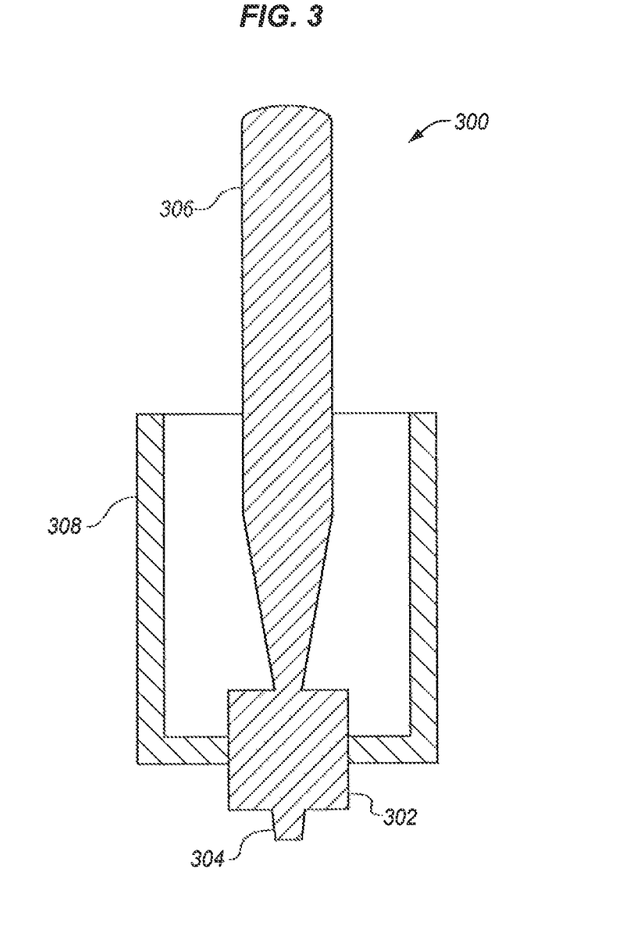
FIG. 3 is a cross-sectional view of a repair pin-stud in an exemplary embodiment.

FIG. 3 is a cross-sectional view of a repair pin-stud 300 in an exemplary embodiment. Repair pin-stud 300 as in FIG. 3 may be used in a repair process to fix damage to honeycomb panel assembly 100, and reinforce the damaged section. Repair pin-stud 300 includes a stud member 302, a tip 304 on one end of stud member 302, and an elongated installation member 306 connected to the opposing end of stud member 302. Stud member 302 is a solid member having a cylindrical shape. The tip 304 on one end (the bottom end of stud member 302 in FIG. 3) of stud member 302 is for producing an arc in a welding process to weld the bottom end of stud member 302 to an inner surface of a face sheet. Installation member 306 is configured to attach to or be gripped by a stud welder (or installation gun) so that repair pin-stud 300 can be properly positioned during the repair process. Installation member 306 is a sacrificial member that will be twisted off of repair pin-stud 300 during the repair process. To allow installation member 306 to be twisted off, installation member 306 may have a cylindrical shape that tapers toward a connection point with stud member 302.

Repair pin-stud 300 is further comprised of a tubular pin 308. One end of pin 308 is closed and connects to stud member 302, so that pin 308 is concentric with stud member 302. The other end of pin 308 is open as the interior of pin 308 is hollow. The length of the hollow portion of pin 308 extends in same direction as the length of installation member 306. Installation member 306 is longer than pin 308 so that installation member 306 extends outwardly from the open end of pin 308.

Figure 4:
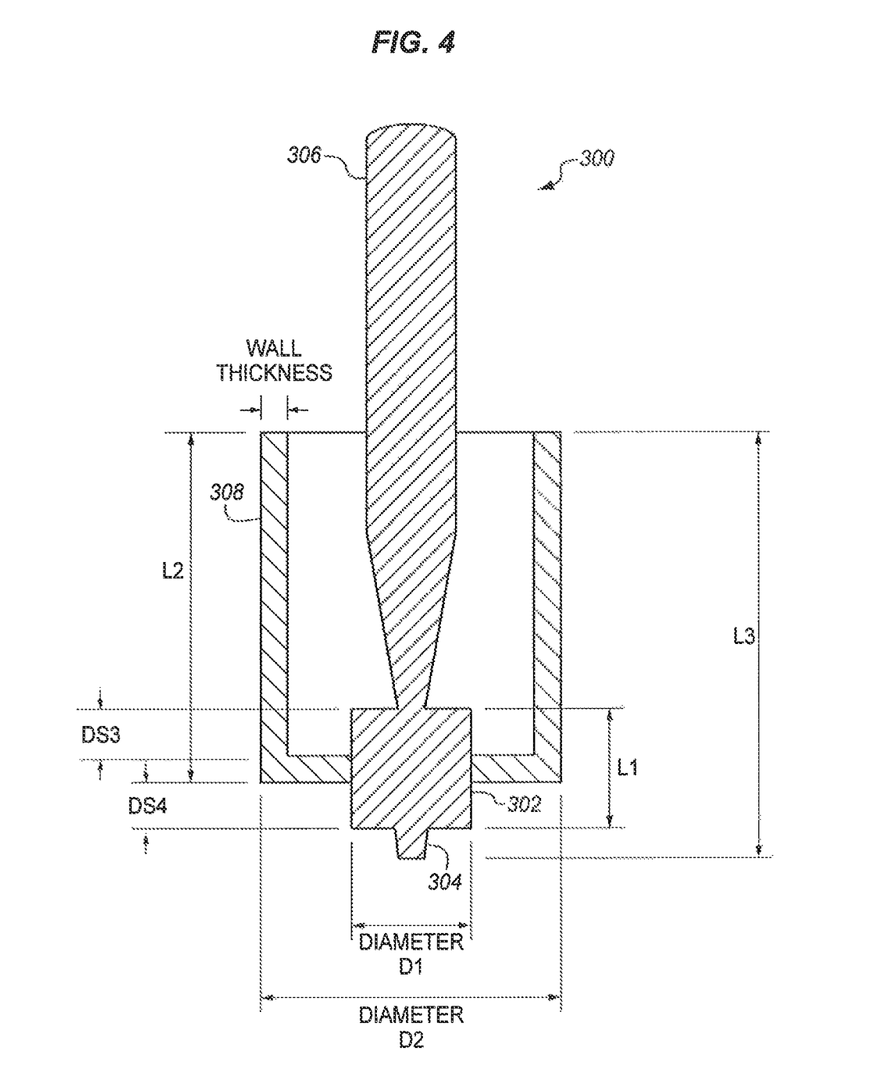
FIG. 4 is another cross-sectional view of a repair pin-stud in an exemplary embodiment.

FIG. 4 is another cross-sectional view of repair pin-stud 300 in an exemplary embodiment. Stud member 302 is cylindrical and may have a diameter D1. A length L1 of stud member 302 is less than a thickness of honeycomb panel assembly 100. Pin 308 is a hollow, tubular cylinder having an outer diameter D2. The inner diameter of pin 308 is greater than the diameter of stud member 302. The inner diameter of pin 308 depends on the wall thickness of pin 308. The length L2 of pin 308 may depend on the thickness of honeycomb panel assembly 100. The overall length L3 of repair pin-stud 300, from tip 304 to the open end of pin 308, should be equivalent to or longer than the thickness of honeycomb panel assembly 100. Thus, the length of pin 308 may vary depending on the desired length of repair pin-stud 300. Stud member 302 and pin 308 may be made from a Nickel alloy or similar material.

The connection point where pin 308 connects with stud member 302 is configurable. In FIG. 3, pin 308 is connected to the circumference of stud member 302, and the distance between the connection point of pin 308 and a top end of stud member 302 in FIG. 4 is illustrated as DS3. The distance between the connection point of pin 308 and a bottom end of stud member 302 in FIG. 4 is illustrated as DS4. The dimensions of DS3 and DS4 may vary as desired.

Figure 5:
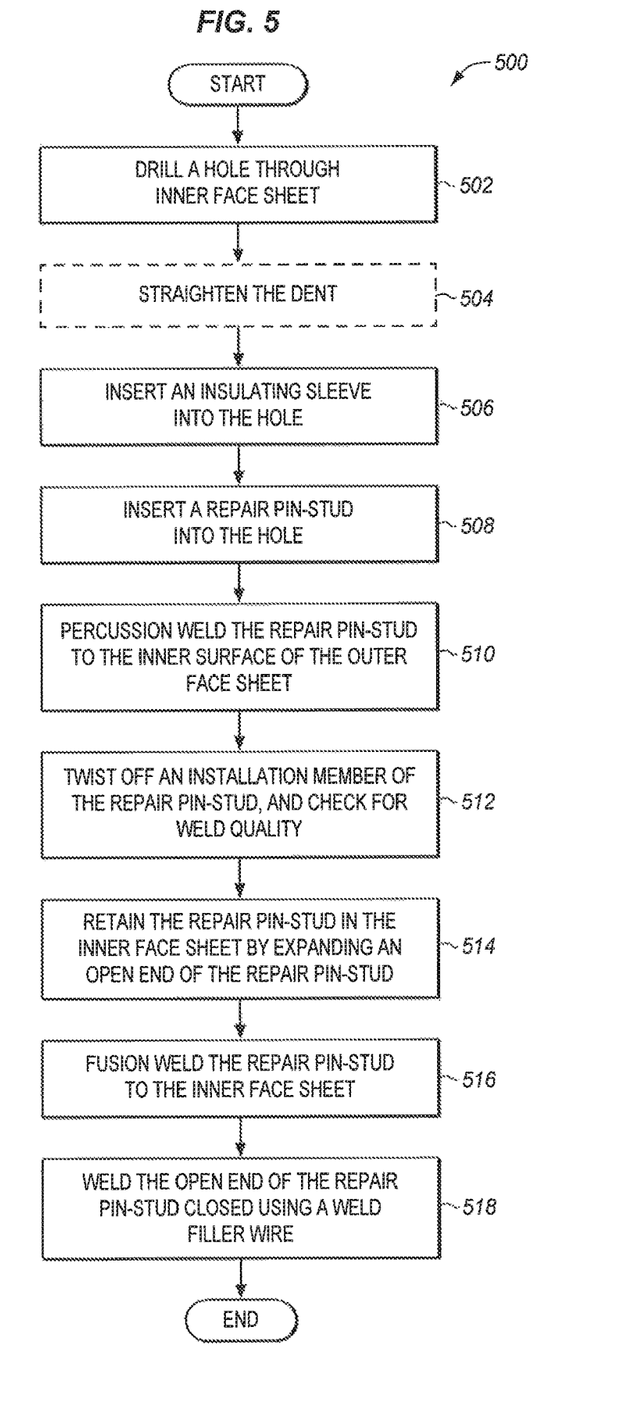
FIG. 5 is a flow chart illustrating a method of repairing a honeycomb panel assembly in an exemplary embodiment.

FIG. 5 is a flow chart illustrating a method 500 of repairing honeycomb panel assembly 100 in an exemplary embodiment. The steps of the methods described herein are not all inclusive and may include other steps not shown. The steps for the flow charts shown herein may also be performed in an alternative order.

Figure 6:
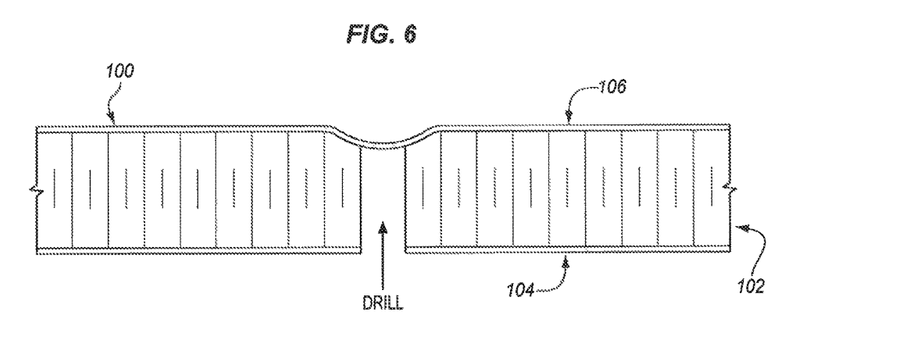
FIG. 6 is a side view illustrating a hole drilled in a honeycomb panel assembly in an exemplary embodiment.

One step of the repair process is to drill a hole through inner face sheet 104 (see step 502). Because the dent in FIG. 2 is in outer face sheet 106, the hole will be drilled through the inner face sheet 104 to within about 0.010 inches of the inner surface of outer face sheet 106. The diameter of the hole is larger than the diameter of repair pin-stud 300. FIG. 6 is a side view illustrating a hole drilled in honeycomb panel assembly 100 in an exemplary embodiment.

Figure 7:
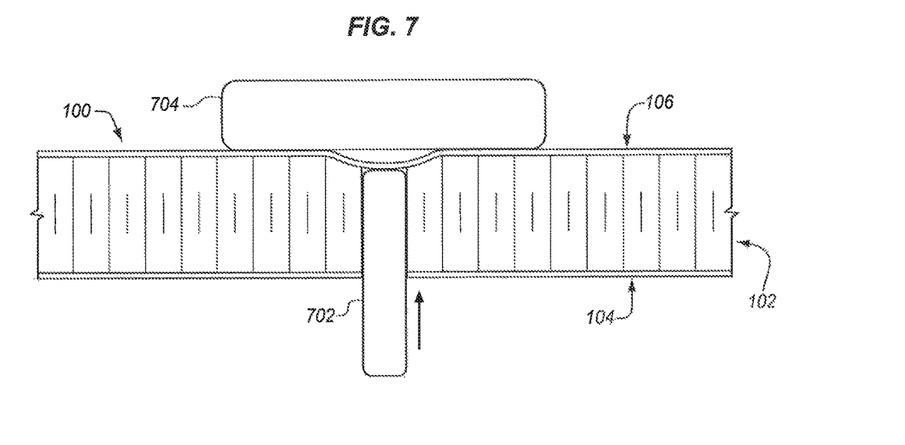
FIG. 7 is a side view illustrating a solid rod inserted into a hole in a honeycomb panel assembly in an exemplary embodiment.

If the damage to honeycomb panel assembly 100 is a dent in outer face sheet 106 (as shown in FIG. 2), then the repair process may include straightening the dent in step 504 (this step is optional as indicated by dotted lines). To straighten the dent, the repair process may include inserting a solid rod into the hole drilled in step 502. FIG. 7 is a side view illustrating a solid rod 702 inserted into the hole in honeycomb panel assembly 100 in an exemplary embodiment. Rod 702 may be pressed against the dent to straighten the dent back to a blueprint contour. As shown in FIG. 7, a phenolic block 704 having a desired contour may be placed on the outer surface of outer face sheet 106 to assist in straightening the dent. After the dented area has a desired contour, rod 702 may be removed from the hole. An endmill may then be inserted into the hole to remove all material down to the braze alloy in the hole where there is core or other debris in the way. The repair process may also include blowing or vacuuming out the hole to make sure no material is in the way.

Figure 8:
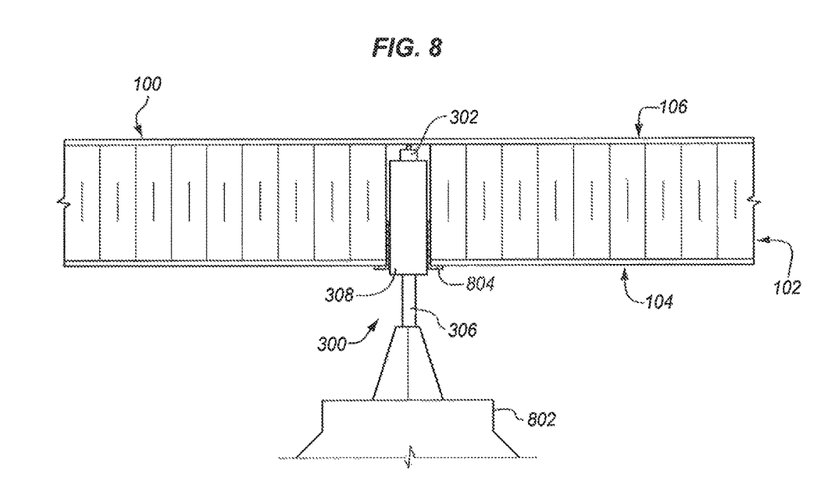
FIG. 8 is a side view illustrating a repair pin-stud inserted into a hole in a honeycomb panel assembly in an exemplary embodiment.

When the hole is prepared, the repair process includes inserting an insulating sleeve in the hole in step 506. The repair process then includes inserting repair pin-stud 300 in the hole in step 508. To insert repair pin-stud 300 into the hole, installation member 306 of repair pin-stud 300 is installed in the end of a stud welder. With the repair pin-stud 300 loaded in the stud welder, the repair pin-stud 300 may then be inserted into the hole in honeycomb panel assembly 100. FIG. 8 is a side view illustrating repair pin-stud 300 inserted into the hole in honeycomb panel assembly 100 in an exemplary embodiment. As shown in FIG. 8, the installation member 306 of repair pin-stud 300 is inserted in a stud welder 802. Stud welder 802 is then able to insert repair pin-stud 300 into the hole in honeycomb panel assembly 100 where insulating sleeve 804 is already inserted.

Figure 9:
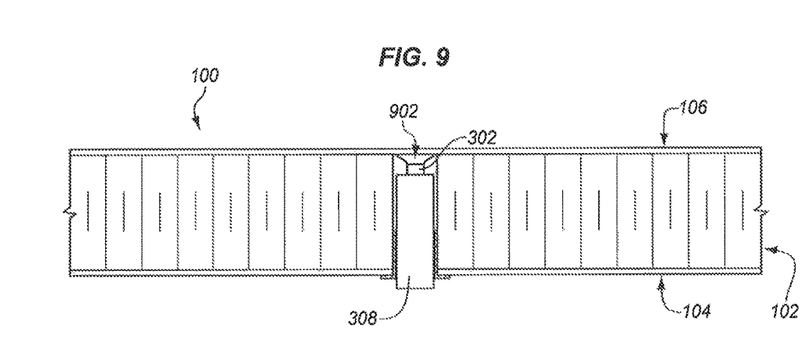
FIG. 9 is a side view illustrating a repair pin-stud welded to an outer face sheet in an exemplary embodiment.

After repair pin-stud 300 is inserted into the hole, the repair process includes percussion welding (also referred to as capacitor discharge stud welding) repair pin-stud 300 to the inner surface of outer face sheet 106 in step 510. FIG. 9 is a side view illustrating repair pin-stud 300 welded to outer face sheet 106 in an exemplary embodiment. During the percussion welding process, tip 304 of repair pin-stud 300 produces an arc between the end of stud member 302 and the inner surface of outer face sheet 106 which forms a weld 902 between stud member 302 and outer face sheet 106. Stud welder 802 makes the percussion weld using a foot support for proper alignment and force setting. The repair process then includes twisting off the installation member 306 of repair pin-stud 300 in step 512. When installation member 306 is twisted off, this checks the quality of the percussion weld 902. If the weld 902 comes loose when twisting off installation member 306, then the above steps are repeated to weld a new repair pin-stud 300 in place.

Figure 10:
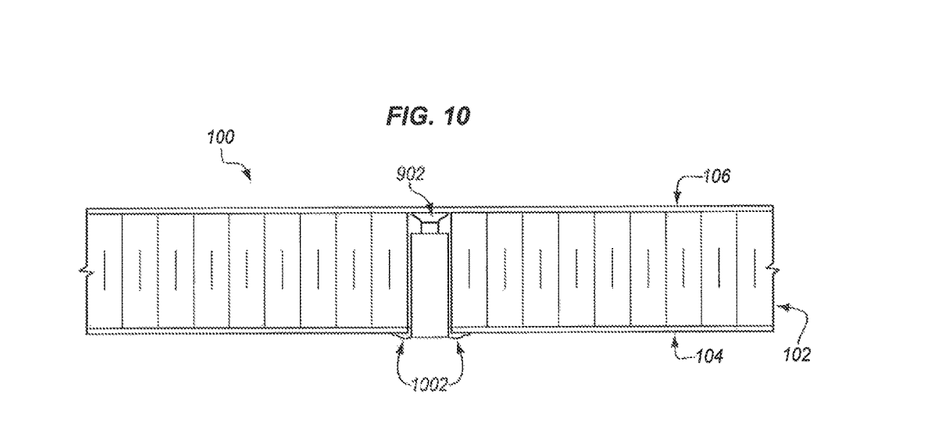
FIG. 10 is a side view illustrating a repair pin-stud welded to an inner face sheet in an exemplary embodiment.
Figure 11:
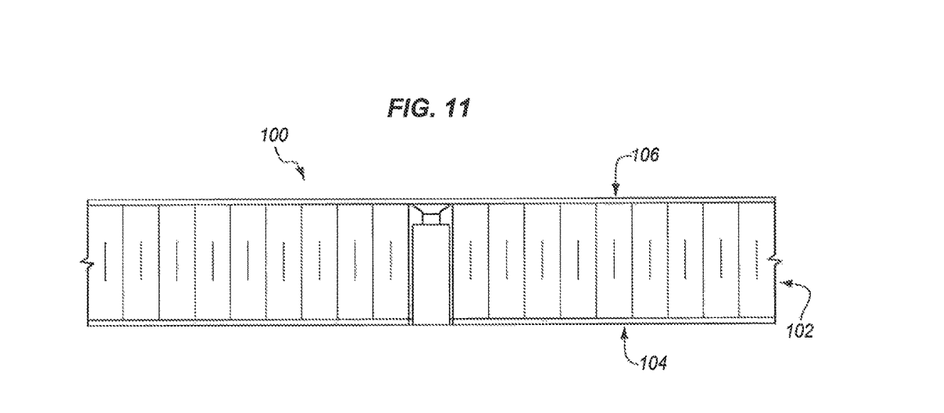
FIG. 11 is a side view illustrating a repair pin-stud installed after grinding welds in an exemplary embodiment.

With the repair pin-stud 300 welded into place, the open end of repair pin-stud 300 may protrude slightly from the hole in inner face sheet 104. Therefore, the repair process may include retaining the repair pin-stud 300 in inner face sheet 104 by expanding the open end of repair pin-stud 300 in step 514. The open end of repair pin-stud 300 may be expanded using a drift pin and a backup block on the opposite side of panel 100. The repair process then includes fusion welding the repair pin-stud 300 to inner face sheet 104 by welding around the circumference of repair pin-stud 300 (step 516). FIG. 10 is a side view illustrating repair pin-stud 300 welded to inner face sheet 104 in an exemplary embodiment. FIG. 10 shows the welds 1002 around the circumference of repair pin-stud 300. After repair pin-stud 300 is welded in step 516, the end of repair pin-stud 300 is still open. Thus, the repair process includes welding the open end of repair pin-stud 300 closed using a weld filler wire in step 518. The welds on inner face sheet 104 may then be grinded down to be substantially flush with the surface of inner face sheet 104. FIG. 11 is a side view illustrating repair pin-stud 300 installed after grinding the welds in an exemplary embodiment. The visible welds may then be inspected on the surface of inner face sheet 104. If the welds pass inspection, then the repair is complete on honeycomb panel assembly 100.

The repair process described in FIG. 5 may be used to repair a dent or other contour issue with outer face sheet 106 (or inner face sheet). Another type of damage to honeycomb panel assembly 100 may be disbonding of inner face sheet 104 or outer face sheet 106 from honeycomb core 102, cracking of inner face sheet 104 or outer face sheet 106, a puncture in inner face sheet 104 or outer face sheet 106, etc. A similar repair process may be used to fix this damage to honeycomb panel assembly 100, which is described further in FIG. 12.

Figure 12:
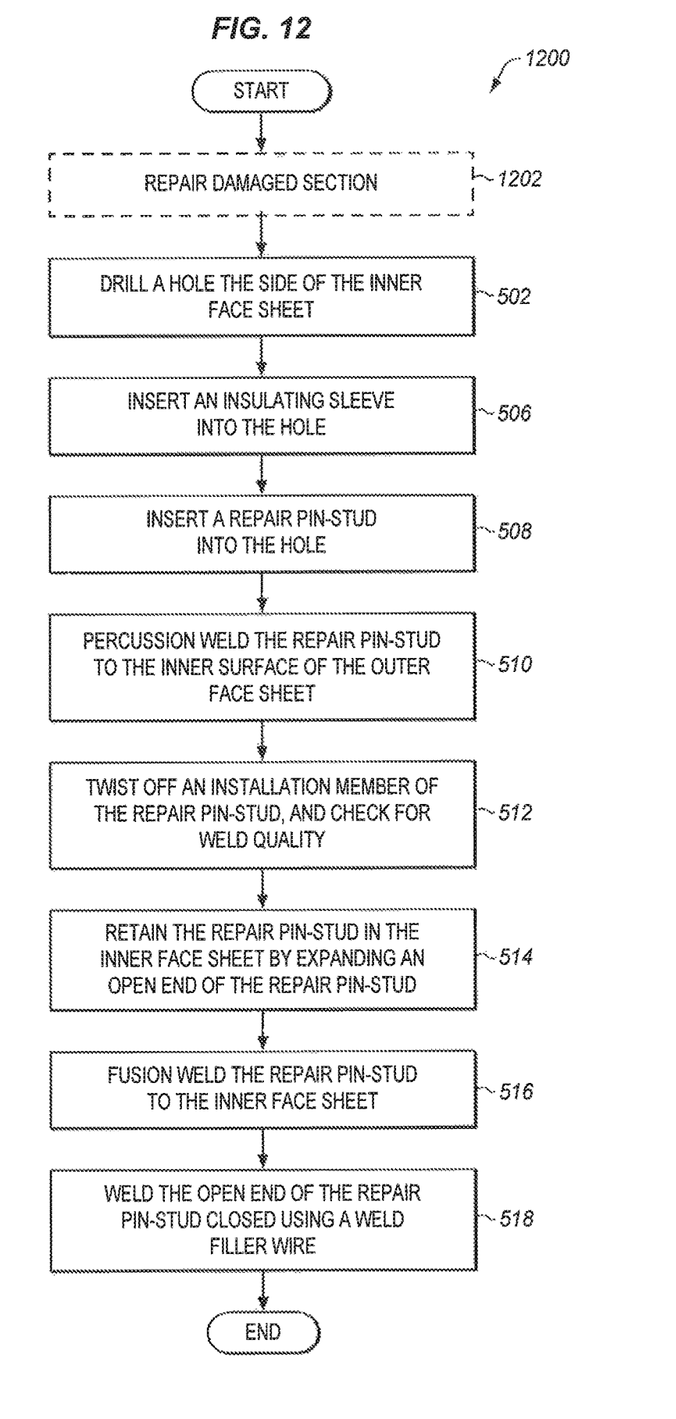
FIG. 12 is a flow chart illustrating another method of repairing a honeycomb panel assembly in an exemplary embodiment.

FIG. 12 is a flow chart illustrating another method 1200 of repairing honeycomb panel assembly 100 in an exemplary embodiment. The steps of method 1200 which are similar to method 500 use a common reference number.

Figure 13:
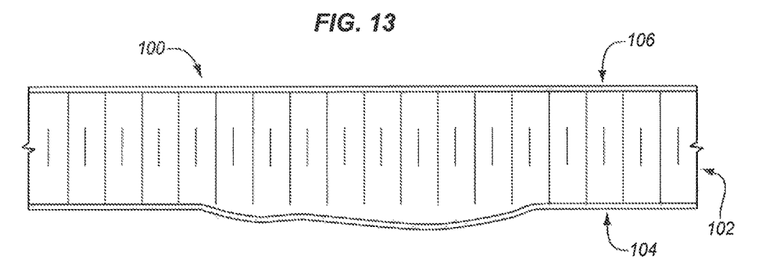
FIG. 13 is a side view of a honeycomb panel assembly illustrating disbonding of an inner face sheet from a honeycomb core in an exemplary embodiment.
Figure 14:
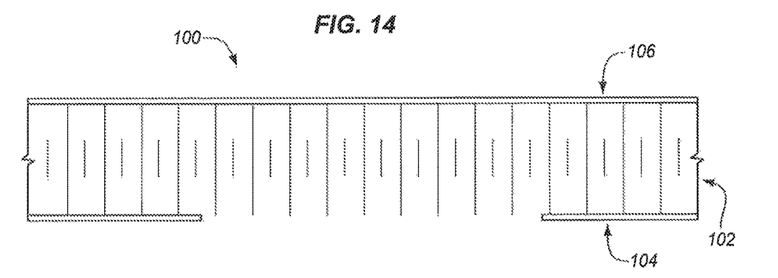
FIG. 14 is a side view of a honeycomb panel assembly with a damaged section removed from an inner face sheet in an exemplary embodiment.
Figure 15:
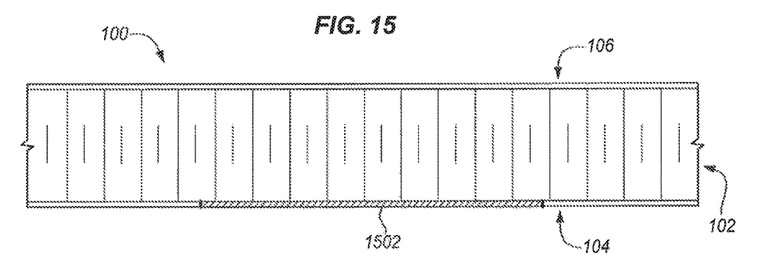
FIG. 15 is a side view of a honeycomb panel assembly with a patch installed in an inner face sheet in an exemplary embodiment.

One step of the repair process is to fix the damaged section of the face sheet in step 1202. FIG. 13 is a side view of honeycomb panel assembly 100 illustrating disbonding of inner face sheet 104 from honeycomb core 102 in an exemplary embodiment. To fix the damaged section of inner face sheet 104, the repair process may include cutting or removing the damaged section from inner face sheet 104 without damaging honeycomb core 102. FIG. 14 is a side view of honeycomb panel assembly 100 with a damaged section removed from inner face sheet 104 in an exemplary embodiment. A patch may then be prepared that is of a similar shape as the damaged section removed from inner face sheet 104. The patch may then be installed in place of the damaged section by welding the patch to inner face sheet 104. FIG. 15 is a side view of honeycomb panel assembly 100 with a patch 1502 installed in inner face sheet 104 in an exemplary embodiment. The welds on patch 1502 may then be inspected for cracks.

Figure 16:
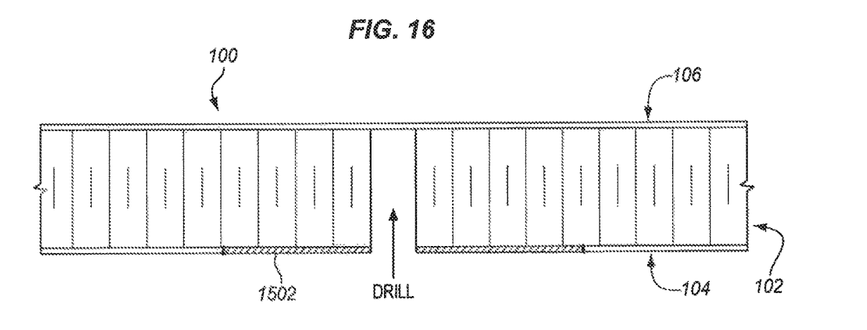
FIG. 16 is a side view illustrating a hole drilled in a honeycomb panel assembly in an exemplary embodiment.

The repair process then includes drilling a hole through inner face sheet 104. If the original damage was to inner face sheet 104, then the hole will actually be drilled through the patch 1502 in inner face sheet 104 (see step 502). FIG. 16 is a side view illustrating a hole drilled in honeycomb panel assembly 100 in an exemplary embodiment. An endmill may then be inserted into the hole to remove all material down to the braze alloy in the hole where there is core or other debris in the way. The repair process may also include blowing or vacuuming out the hole to make sure no material is in the way.

Figure 17:
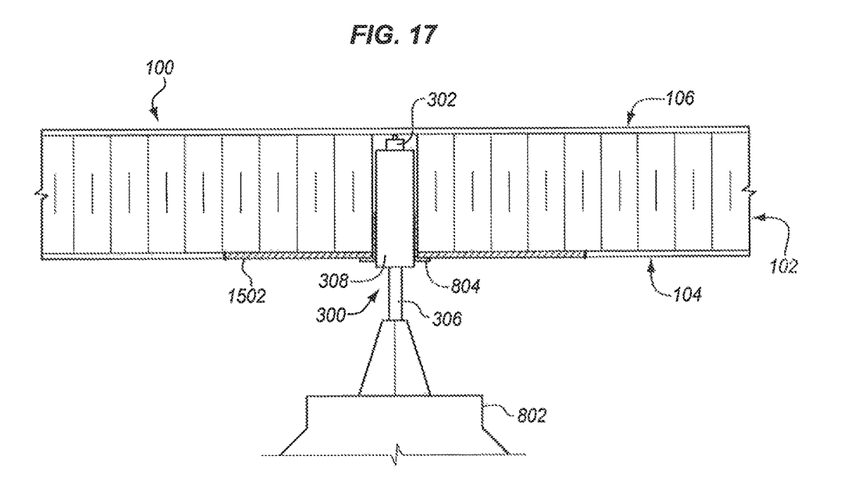
FIG. 17 is a side view illustrating a repair pin-stud inserted into a hole in a honeycomb panel assembly in an exemplary embodiment.

When the hole is prepared, the repair process includes inserting an insulating sleeve in the hole in step 506. The repair process then includes inserting repair pin-stud 300 in the hole in step 508. To insert repair pin-stud 300 into the hole, the repair pin-stud 300 is inserted in a stud welder. With the repair pin-stud 300 loaded in the stud welder, the repair pin-stud 300 may be inserted into the hole in honeycomb panel assembly 100. FIG. 17 is a side view illustrating repair pin-stud 300 inserted into the hole in honeycomb panel assembly 100 in an exemplary embodiment. As shown in FIG. 17, stud welder 802 holds repair pin-stud 300 by installation member 306, and inserts repair pin-stud 300 into the hole in honeycomb panel assembly 100 where insulating sleeve 804 is already inserted.

Figure 18:
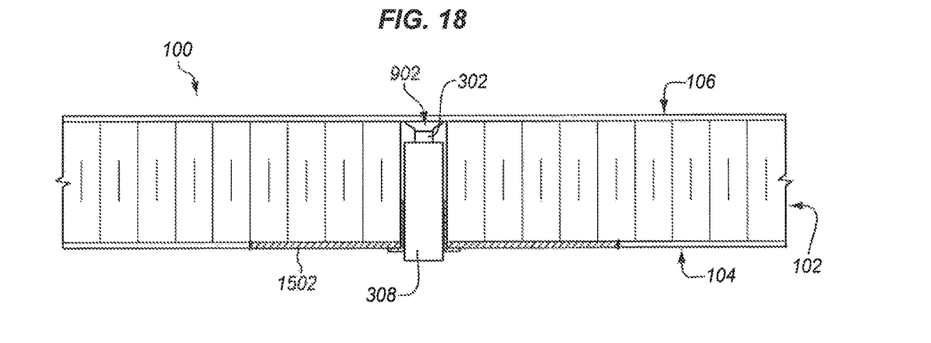
FIG. 18 is a side view illustrating a repair pin-stud welded to an outer face sheet in an exemplary embodiment.

After repair pin-stud 300 is inserted into the hole, the repair process includes percussion welding repair pin-stud 300 to the inner surface of outer face sheet 106 in step 510. FIG. 18 is a side view illustrating repair pin-stud 300 welded to outer face sheet 106 in an exemplary embodiment. The percussion welding process forms a weld 902 between stud member 302 and outer face sheet 106. The repair process then includes twisting off the installation member 306 of repair pin-stud 300 in step 512. When installation member 306 is twisted off, this checks the quality of the percussion weld 902. If the weld 902 comes loose when twisting off installation member 306, then the above steps are repeated to weld a new repair pin-stud 300 in place.

Figure 19:
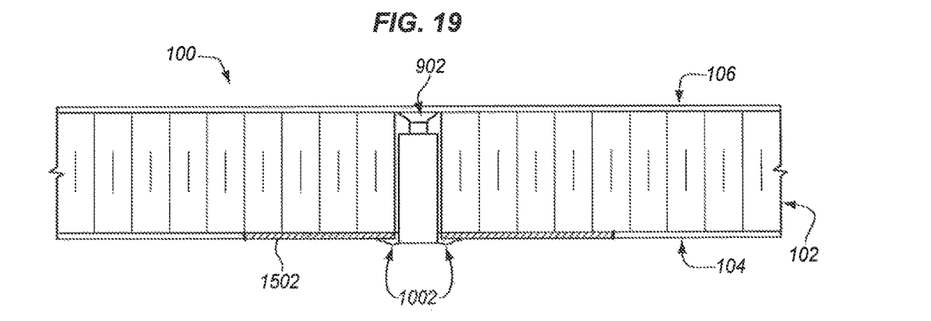
FIG. 19 is a side view illustrating a repair pin-stud welded to an inner face sheet in an exemplary embodiment.
Figure 20:
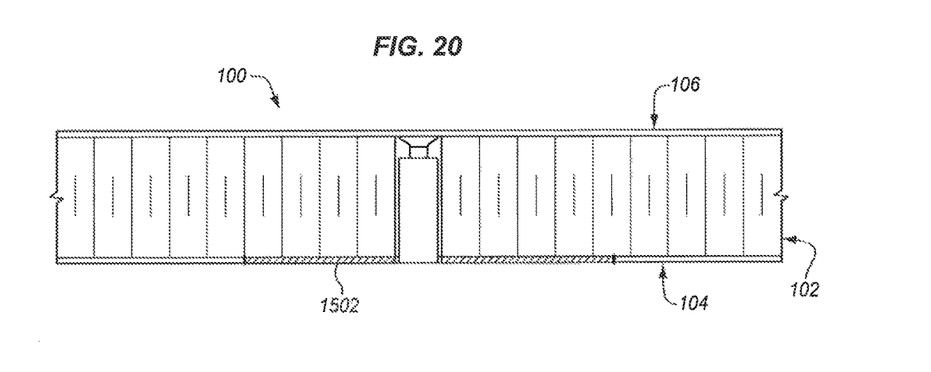
FIG. 20 is a side view illustrating a repair pin-stud installed after grinding welds in an exemplary embodiment.

With the repair pin-stud 300 welded into place, the open end of repair pin-stud 300 may protrude slightly from the hole in inner face sheet 104. Therefore, the repair process may include retaining the repair pin-stud 300 in inner face sheet 104 by expanding the open end of repair pin-stud 300 in step 514. The repair process then includes fusion welding the repair pin-stud 300 to inner face sheet 104 by welding around the circumference of repair pin-stud 300 (step 516). FIG. 19 is a side view illustrating repair pin-stud 300 welded to inner face sheet 104 in an exemplary embodiment. In this embodiment, repair pin-stud 300 is actually welded to patch 1502 of inner face sheet 104 (which is illustrated by welds 1002). After repair pin-stud 300 is welded in step 516, the end of repair pin-stud 300 is still open. Thus, the repair process includes welding the open end of repair pin-stud 300 closed using a weld filler wire in step 518. The welds on inner face sheet 104 may then be grinded down to be substantially flush with the surface of inner face sheet 104. FIG. 20 is a side view illustrating repair pin-stud 300 installed after grinding the welds in an exemplary embodiment. The visible welds may then be inspected on the surface of inner face sheet 104. If the welds pass inspection, then the repair is complete on honeycomb panel assembly 100.

Although specific embodiments were described herein, the scope is not limited to those specific embodiments. Rather, the scope is defined by the following claims and any equivalents thereof.

The invention claimed is:

1. A method of repairing damage to a panel having a core sandwiched between an inner face sheet and an outer face sheet, the method comprising:
   drilling a hole through the inner face sheet of the panel;
   inserting a sleeve into the hole;
   inserting a repair pin-stud into the hole wherein the repair pin-stud includes a tip on a first end, and an installation member that extends from a second end that is open;
   percussion welding the tip end of the repair pin-stud to an inner surface of the outer face sheet with a stud welder that grips the installation member of the repair pin-stud;
   twisting off the installation member of the repair pin-stud;
   fusion welding the second end of the repair pin-stud to the inner face sheet; and
   welding the second end of the repair pin-stud closed using a weld filler wire.

2. The method of claim 1 further comprising:
   retaining the repair pin-stud in the inner face sheet by expanding the second end of the repair pin-stud before fusion welding the repair pin-stud to the inner face sheet.

3. The method of claim 1 further comprising:
   grinding the welds on the inner face sheet to be flush with the inner face sheet.

4. The method of claim 1 wherein the damage comprises a dent in the outer face sheet, the method further comprising:
   straightening the dent in the outer face sheet before inserting the repair pin-stud into the hole.

5. The method of claim 4 wherein straightening the dent in the outer face sheet comprises:
   inserting a solid rod into the hole; and
   pressing the solid rod against the dent to return a contour of the outer face sheet to a blueprint contour.

6. The method of claim 5 wherein straightening the dent in the outer face sheet comprises:
   placing a phenolic block on an outer surface of the outer face sheet when pressing the solid rod against the dent.

7. The method of claim 1 further comprising:
   cutting a section from the inner face sheet;
   preparing a patch for the inner face sheet; and
   welding the patch to the inner face sheet.

8. The method of claim 1 further comprising:
   inserting the installation member of the repair pin-stud in the stud welder.

9. A method of repairing a panel having a core sandwiched between an inner face sheet and an outer face sheet, the method comprising:
   drilling a hole through the inner face sheet of the panel;
   installing a repair pin-stud in a stud welder, wherein the repair pin-stud includes a cylindrical stud member having a tip at a first end and an elongated installation member at a second end, and includes a tubular pin concentric with the cylindrical stud member and having a larger diameter than the cylindrical stud member;
   wherein one end of the tubular pin connects to the cylindrical stud member, and the tubular pin extends in a direction of the elongated installation member to an opposing open end;
   wherein the elongated installation member is gripped by the stud welder;
   inserting the repair pin-stud into the hole;
   welding the repair pin-stud to the outer face sheet with the stud welder by welding the first end of the cylindrical stud member having the tip to an inner surface of the outer face sheet;
   twisting off the elongated installation member of the repair pin-stud after welding the first end of the cylindrical stud member to the inner surface of the outer face sheet; and
   welding the repair pin-stud to the inner face sheet by welding around a circumference of the open end of the tubular pin.

10. The method of claim 9 further comprising:
    welding the open end of the tubular pin closed.

11. The method of claim 10 further comprising:
    grinding welds down to be flush with a surface of the inner face sheet.

12. The method of claim 9 wherein when the open end of the tubular pin protrudes from the hole in the inner face sheet after welding the first end of the cylindrical stud member to the inner surface of the outer face sheet, the method further comprises:
    retaining the repair pin-stud in the inner face sheet by expanding the open end of the tubular pin.

13. A method of repairing a honeycomb panel having a honeycomb core sandwiched between an inner face sheet and an outer face sheet, the method comprising:
    drilling a hole through the inner face sheet and stopping short of the outer face sheet, wherein a diameter of the hole is larger than a diameter of a repair pin-stud used to repair the honeycomb panel;
    wherein the repair pin-stud includes a cylindrical stud member having a tip at a first end and an elongated installation member at a second end, and includes a tubular pin concentric with the cylindrical stud member and having a larger diameter than the cylindrical stud member;
    wherein one end of the tubular pin connects to the cylindrical stud member, and the tubular pin extends in a direction of the elongated installation member to an opposing open end;
    installing the elongated installation member of the repair pin-stud in a stud welder;
    inserting an insulation sleeve into the hole;
    inserting the repair pin-stud into the hole where the insulation sleeve was already inserted;

welding the repair pin-stud to the outer face sheet with the stud welder by welding the first end of the cylindrical stud member having the tip to an inner surface of the outer face sheet;

twisting off the elongated installation member of the repair pin-stud after welding the first end of the cylindrical stud member to the inner surface of the outer face sheet;

and welding the repair pin-stud to the inner face sheet by welding around a circumference of the open end of the tubular pin.

14. The method of claim 13 further comprising:

welding the open end of the tubular pin closed using a weld filler wire.

15. The method of claim 14 further comprising:

grinding welds down to be flush with a surface of the inner face sheet.

16. The method of claim 13 wherein when the open end of the tubular pin protrudes from the hole in the inner face sheet after welding the first end of the cylindrical stud member to the inner surface of the outer face sheet, the method further comprises:

retaining the repair pin-stud in the inner face sheet by expanding the open end of the tubular pin.

17. The method of claim 13 wherein to repair a dent in the outer face sheet, the step of drilling the hole through the inner face sheet comprises:

drilling the hole through the inner face sheet opposite the dent in the outer face sheet.

18. The method of claim 17 further comprising:

inserting a rod into the hole in the inner face sheet;

placing a block on an outer surface of the outer face sheet;

pressing the rod against the dent to straighten the dent; and removing the rod from the hole.

19. The method of claim 13 wherein to repair a damaged section of the inner face sheet, the method further includes:

cutting the damaged section from the inner face sheet without damaging the honeycomb core; and installing a patch in place of the damaged section by welding the patch to the inner face sheet;

wherein drilling the hole through the inner face sheet comprises drilling the hole through the patch in the inner face sheet.

\* \* \* \* \*

UNITED STATES PATENT AND TRADEMARK OFFICE
CERTIFICATE OF CORRECTION

| | |
|---|---|
| PATENT NO. | : 10,384,287 B2 |
| APPLICATION NO. | : 15/428116 |
| DATED | : August 20, 2019 |
| INVENTOR(S) | : Howe Hao Yu |

Page 1 of 1

It is certified that error appears in the above-identified patent and that said Letters Patent is hereby corrected as shown below:

On the Title Page

Item (54) and in the Specification, Column 1 Lines 1-2 The Title, "REPAIR PIN-STUD FOR REPAIRING HONEYCOMB PEARLS" should read --REPAIR PIN-STUD FOR REPAIRING HONEYCOMB PANELS--

Signed and Sealed this
Twenty-second Day of October, 2019

Andrei Iancu
*Director of the United States Patent and Trademark Office*